(12) United States Patent
Garza-Gonzalez

(10) Patent No.: US 8,738,658 B2
(45) Date of Patent: May 27, 2014

(54) METHOD FOR USING PATHS IN A DIRECTORY FOR LOCATING OBJECTS

(75) Inventor: Daniel C. Garza-Gonzalez, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 876 days.

(21) Appl. No.: 12/108,466

(22) Filed: Apr. 23, 2008

(65) Prior Publication Data
US 2008/0301183 A1    Dec. 4, 2008

Related U.S. Application Data

(60) Provisional application No. 60/941,860, filed on Jun. 4, 2007.

(51) Int. Cl.
*G06F 17/30* (2006.01)

(52) U.S. Cl.
USPC .......................................... 707/802; 707/812

(58) Field of Classification Search
USPC ........... 707/999.103, 802, 809, 812; 709/201, 709/242, 244, 221
See application file for complete search history.

(56) References Cited

U.S. PATENT DOCUMENTS

| | | | |
|---|---|---|---|
| 6,366,913 B1 * | 4/2002 | Fitler et al. | 709/203 |
| 6,366,954 B1 * | 4/2002 | Traversat et al. | 709/220 |
| 6,901,410 B2 * | 5/2005 | Marron et al. | 1/1 |
| 6,985,905 B2 * | 1/2006 | Prompt et al. | 707/829 |
| 7,720,881 B2 * | 5/2010 | Rowley | 707/803 |
| 7,774,428 B2 * | 8/2010 | Yu | 709/218 |
| 2002/0147857 A1 * | 10/2002 | Sanchez et al. | 709/316 |
| 2005/0165807 A1 * | 7/2005 | Srinivasan et al. | 707/100 |
| 2006/0265364 A1 * | 11/2006 | Keith | 707/3 |

OTHER PUBLICATIONS

William Boswell; "Understanding Active Directory Services"; by Addison Wesley on Oct. 10, 2003; 50 pages.*
T. Howes, Network Working Group, Request for Comments: 2254, Netscape Communications Corp., Category: Standards Track, The String Representation of LDAP Search Filters, Dec. 1997 (8 pages).

* cited by examiner

*Primary Examiner* — Monica Pyo

(57) ABSTRACT

One embodiment is a method that discovers branches and groups that include a reference to an object located in a directory information tree. Paths are determined through the directory information tree to the branches and the groups. Information about the paths is then used to describe the object in the directory information tree.

21 Claims, 3 Drawing Sheets

METHOD FOR USING PATHS IN A DIRECTORY FOR LOCATING OBJECTS

CROSS-REFERENCE TO RELATED APPLICATION

This application incorporates by reference and claims priority to provisional patent application having Ser. No. 60/941,860 entitled "Method for Searching LDAP Directory for Containers of Specific Member Object" and filed on Jun. 4, 2007.

BACKGROUND

Databases can include directories that contain vast amounts of data about people and objects. Such data can be represented in complex hierarchical tree structures that include thousands or even millions of entries.

Directories are often searched for specific objects or containers. Searching a directory for such an object is often time-consuming and process intensive, especially when limited information is known about the object or its location in the directory.

Improvements in searching databases and directories can lead to faster queries that are more accurate and less process intensive.

SUMMARY OF THE INVENTION

One example embodiment is a method that discovers branches and groups that include a reference to an object located in a directory information tree. The method determines paths through the directory information tree to the branches and the groups, and uses information about the paths to locate the object in one of the groups in the directory information tree.

DETAILED DESCRIPTION

Figure 1:
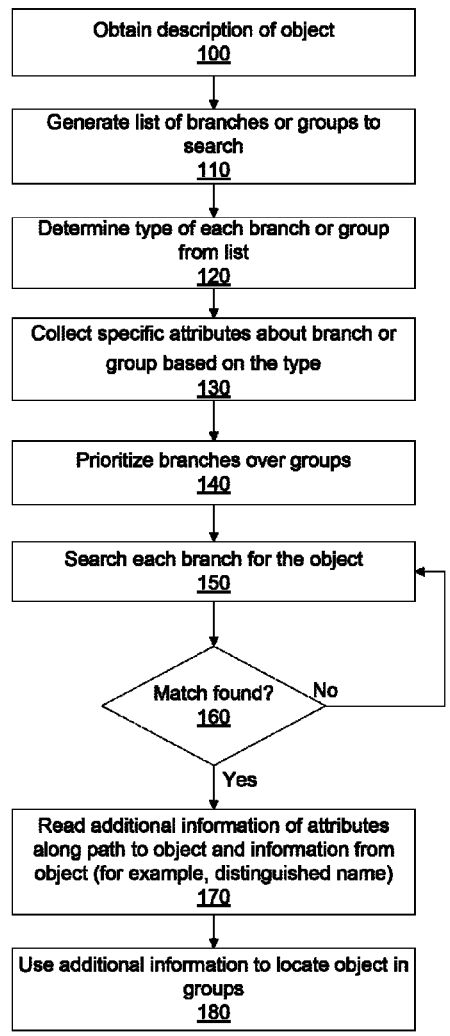
FIG. 1 is a flow diagram for using branch and/or group information to find an object in a directory information tree in accordance with an exemplary embodiment of the invention.

Embodiments are directed to systems, methods, and apparatus for searching directory information trees or database directories for containers of specific member objects. Based on input of one or more branches or groups and a member object, exemplary embodiments search for branches and groups containing the member object. Information about branches or groups to which the member object belongs is used to increase a likelihood of finding the member object and desired attributes about containers.

The description uses the searching of computer objects from an LDAP directory as an example. Exemplary embodiments, however, have larger application, such as searching for other types of objects and searching other types of list. The descriptions are not meant to limit the application to the searching of computer objects from an LDAP directory.

In one exemplary embodiment, large amounts of data are kept about certain objects, for example computers, in an LDAP-based directory. In addition to the data represented directly by the object itself (i.e., the data in the object, such as a branch or group within the directory), the path along the directory to the object also includes valuable information. For example, the branches that contain the object can have certain desired attributes. Additionally, specific group objects can contain a reference to desired object. Exemplary embodiments discover these branches and groups and treat them as attributes of the computer object.

Before discussing an exemplary directory tree (such as the directory information tree of FIG. 2), an overview of directory structures for LDAP is provided.

In LDAP directories, the directory is a tree of directory entries; an entry includes a set of attributes; and an attribute has a name (an attribute type or attribute description) and one or more values. The attributes are defined in a schema (see below). Each entry has a unique identifier: its Distinguished Name (DN). The DN includes the Relative Distinguished Name (RDN) constructed from some attribute(s) in the entry, followed by the parent entry's DN. For illustration, the DN can be thought of as a full filename and the RDN as a relative filename in a folder. It should be understood that a DN can change over the lifetime of the entry, for instance, when entries are moved within a tree. To reliably and unambiguously identify entries, a UUID (Universally Unique Identifier) can be provided in the set of the entry's operational attributes.

Entries can have a variety of attributes and information. The following entry merely provides an exemplary entry as represented in LDAP Data Interchange Format (LDIF) (LDAP itself is a binary protocol):

dn: cn=Daniel Garza,dc=example,dc=com
    cn: Daniel Garza
    givenName: Daniel
    sn: Garza
    telephoneNumber: +1 800 711 2884
    telephoneNumber: +1 800 633 3600
    mail: daniel@example.com
    manager: cn=Jonn Doe,dc=example,dc=com
    objectClass: inetOrgPerson
    objectClass: organizationalPerson
    objectClass: top In this example, dn is the name of the entry, not an attribute or part of the entry. "cn=Daniel Garza" is the entry's RDN, and "dc=example,dc=com" is the DN of the parent entry, where dc denotes Domain Component. The other lines show the attributes in the entry. Attribute names are typically mnemonic strings, like "cn" for common name, "dc" for domain component, "mail" for e-mail address and "sn" for surname. Further, a server holds a subtree starting from a specific entry, e.g. "dc=example,dc=coin" and its children. Servers can also hold references to other servers, so an attempt to access "ou=department,dc=example,dc=com" can return a referral or continuation reference to a server which holds that part of the directory tree. The client can then contact the other server. Some servers also support chaining, which means the server contacts the other server and returns the results to the client.

Figure 2:
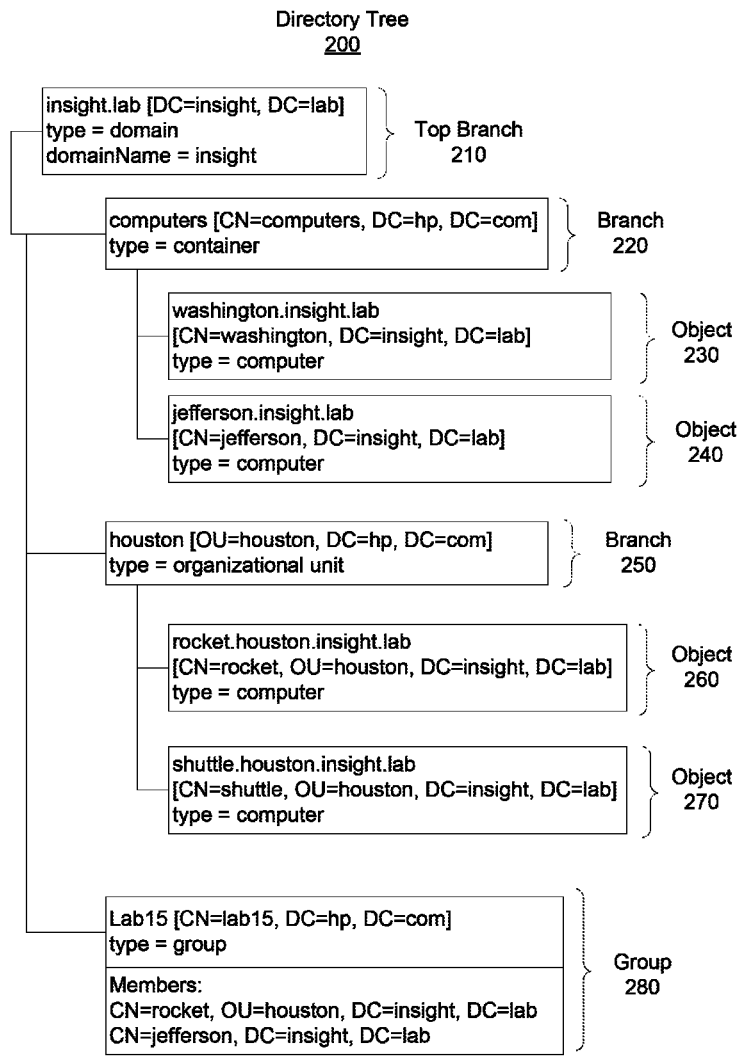
FIG. 2 is an exemplary directory information tree in accordance with an exemplary embodiment of the invention.

FIG. 1 is a flow diagram for using branch and/or group information to find an object in a directory information tree in accordance with an exemplary embodiment of the invention. FIG. 2 is a directory information tree 200 in accordance with an exemplary embodiment. These figures are simultaneously discussed.

For illustration, the tree 200 is described using LDAP. As shown, the tree includes a plurality of entries that include branches, objects, and groups. A top branch 210 includes two branches 220 and 250 and one group 280. Each of the branches includes one or more objects. For example, branch 220 includes objects 230 and 240; and branch 250 includes objects 260 and 270.

Objects or containers in the tree can be members of one or more branches and groups. For example, container or object 230 is a member of both branch 220 and top branch 210. As another example, container or branch 250 is a member of top branch 220.

In one exemplary embodiment, the contents of the entries in a subtree are governed by a schema. The schema defines the attribute types that directory entries can contain. An attribute definition includes a syntax. For example, a "mail" attribute can contain the value "user@example.com". A "member" attribute contains DNs of other directory entries. Attribute definitions also specify whether the attribute is single-valued or multi-valued, how to search/compare the attribute (e.g. case-sensitive vs. case-insensitive and whether substring matching is supported), etc.

The schema also defines object classes. Each entry has an objectClass attribute that includes named classes defined in the schema. The schema definition of the classes of an entry defines what kind of object the entry can represent (for example, a person, organization or domain). The object class definitions also list which attributes are obligatory and which are optional. For example, an entry representing a person might belong to the classes "top" and "person". Membership in the "person" class would require the entry to contain the "sn" and "cn" attributes, and allow the entry also to contain "userPassword", "telephoneNumber", and other attributes. Since entries can belong to multiple classes, each entry has a complex of optional and mandatory attribute sets formed from the union of the object classes it represents. Object-Classes can be inherited, and a single entry can have multiple objectClasses to define the available and required attributes of the entry itself.

To find containers of a desired computer object in a directory, exemplary embodiments describe the computer object and the branches or groups to search. For example, to describe the computer object we may have simply a computer name or a fully-qualified network name, e.g. "washington" or "washington.insight.lab". Then we have a list of one or more branches or groups to search, described by their directory-distinguished names. Note that the distinguished name does not describe the type (branch or group), only its location in the directory. For example "DC=insight, DC=lab" or "CN=lab15, DC=insight, DC=lab".

According to block 100, a description of an object is obtained. By way of example, the object can be subject to a search. For illustration purposes, the object is discussed as being a computer of computer related object.

According to block 110, list of branches or groups to search is generated. Consider the case where we are provided with a list of branches and groups to search.

According to block 120, a determination is made of the type of each branch or group from the list. In other words, each container (branch or group) is examined to determine its type. A branch can be one of several along the path to the computer object itself. Several types of branches can be of interest, for example "organizational unit" or "domain."

According to block 130, specific attributes about the branch or group are collected based on the type. Based on this type, one embodiment collects specific attributes about the branch, for example the domainName attribute for a domain branch. A group, on the other hand, is a separate object that contains a reference to the computer object, e.g. by the computer object's distinguished name.

After determining each container's type, one embodiment prioritizes branches over groups according to block 140. This prioritization is performed since the branch can contain the computer object itself.

Next, according to block 150, search each branch for the object. Continuing with the example of a computer, one embodiment searches each branch for the specified computer, by its either short name or fully-qualified name. A comparison is then made between the known name and specific attributes.

According to block 160, a question is asked whether a match is found. If the answer to this question is "no" then flow proceeds back to block 150 and the search continues. If a match is found, flow proceeds to block 170. Here, additional information is obtained from attributes along the path to the object and additional information read from the object. For example, one embodiment reads additional information from the computer object, such as its distinguished name, to increase the likelihood of successfully finding the computer in any specified groups. As another example, information along the path or branches is obtained. As shown in FIG. 2, where the computer named "rocket", based on its location in the directory, can now be described as a member of "houston", "insight.lab" and domain "insight".

According to block 180, the additional information (such as the distinguished name) is used to locate objects in groups.

One embodiment considers the computer to be a member of each of the branches along its path. Looking to object 260 in FIG. 2, one embodiment considers the computer named "rocket" (distinguished name "CN=rocket, OU=houston, DC=insight, DC=lab") a member of "houston" (distinguished name "OU=houston, DC=insight, DC=lab") and a member of both "insight.lab" and the domain named "insight" (distinguished name "DC=insight, DC=lab"). After finding the computer object's distinguished name, one embodiment uses that name to find the computer in any specified search groups. Again referring to the attachment, we find that "rocket" is a member of the specified group "lab15" shown in group 280.

Now consider the case where we are provided only with groups (no branches) to search. If we are provided with the computer's distinguished name, the search is trivial. However, if given a name or fully qualified network name, exemplary embodiments use the method of shown in FIG. 3.

Figure 3:
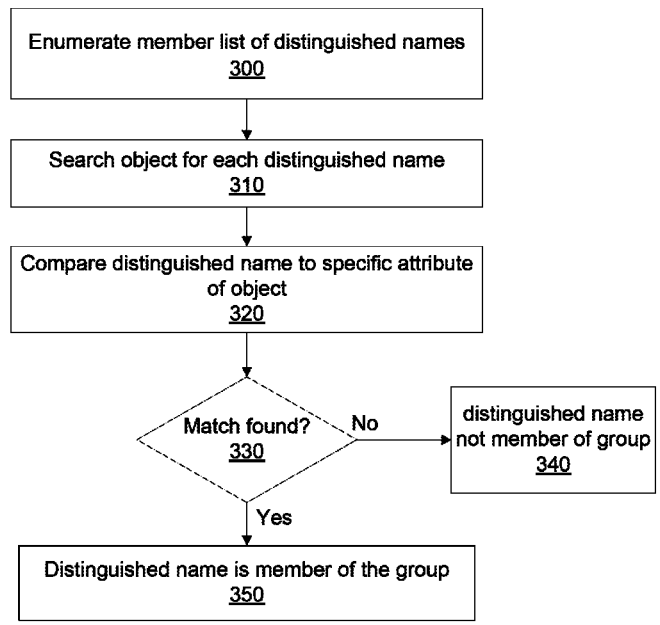
FIG. 3 is a flow diagram for searching only groups to find an object in a directory information tree in accordance with an exemplary embodiment of the invention.

FIG. 3 is a flow diagram for searching only groups to find an object in a directory information tree in accordance with an exemplary embodiment of the invention. FIG. 3 is discussed in conjunction with the directory information tree 200 of FIG. 2.

According to block 300, enumerate a list of distinguished names. For example, enumerate the member list of distinguished names, e.g. "CN=rocket, OU=houston, DC=insight, DC=lab" and "CN=shuttle, OU=houston, DC=insight, DC=lab" shown in group 280.

Next, according to block 310, search the object for each distinguished name. Then, according to block 320, compare the distinguished name to specific attribute of the object. For example, for each distinguished name, search the object it represents, comparing the known computer name to specific attributes of the object.

According to block 330, a determination is made as to whether a match is found. If match is not found, then flow proceeds to block 340 (i.e., the distinguished name is not a member of the group). If a match is found, then flow proceeds to block 350 and the distinguished name is a member of the group.

To facilitate these searches, exemplary embodiments utilize one or more of three specific classes. The first class called AttributeString includes a string representing a name, and a Boolean specifying if the value is to be encoded or not when applied to an LDAP search filter. This class is useful for pre-known strings where we specifically want characters that would normally be escaped or encoded (e.g. per RFC 2254.) A notable example of a predefined string is the wildcard string "*". Left as-is, the string is treated as a wildcard, whereas encoded the string is treated as a search for the asterisk character. Other examples of predefined AttributeString names include "distinguishedName", "objectClass", "member", and "dNSHostName".

One embodiment defines these strings externally, e.g. in XML (Extensible Markup Language) or database. The strings are read at run-time and represented programmatically using well-known object names/references so that they can be extended or modified at run-time to account for different names in different types of LDAP implementations, e.g. Active Directory, OpenLDAP, etc.

The second class is called SearchCriterion and contains two AttributeString instances, one each to represent the name and value of a name-value pair. There are also predefined instances of this second class to specify a known, desired name-value search criterion. For example the predefined object named IS_COMPUTER represents the search criterion "objectClass=computer". Additionally, class methods are available to use known names and allow the value to be specified at run-time. For example, the byDNSHostName( ) method takes a string parameter to complete a search criterion like "dNSHostName=input_value". Both name and value can also be specified at run-time, allowing complete flexibility of search criteria.

The third class is called the SearchAttributes class and is used to collect one or more SearchCriterion instances and compute the corresponding LDAP search filter. Based on the boolean value associated with each AttributeString instance (either name or value of SearchCriterion name-value pair), the string is encoded or not (e.g. per RFC 2254) when computing the LDAP search filter. For example, the search filter "(&(usage=*))" indicates to search for the existence of the "usage" attribute, whereas the search filter "(&(usage=\2A))" indicates to search for a "usage" attribute whose value is "*" where "\2A" is the encoded string for "*".

In one embodiment, when searching for containers of a desired computer object, branches are prioritized over groups to improve the success rate of finding the desired computer object. Each branch is typed (e.g. domain or organizational unit) so that exemplary methods can collect specific attributes based on its type to provide better information about the computer object.

In one embodiment, a branch does not need to be specified. If only a group object is specified to search, the list of members is enumerated so that each member object can be searched for the desired computer object.

Programmatically, the search process is simplified by three classes: the AttributeString class allows strings to be predefined for encoding or not in the resulting LDAP search filter, and allows these strings to be configured externally at runtime, e.g. via XML file, allowing more flexible support for different directory service implementations; the SearchCriterion class simplifies usage of name-value criteria by utilizing predefined named class instances and methods; and the SearchAttributes class computes the final LDAP search filter.

Figure 4:
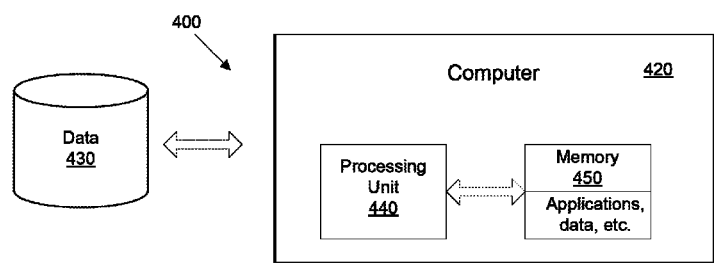
FIG. 4 is an exemplary computer system in accordance with an exemplary embodiment of the present invention.

Embodiments in accordance with the present invention are utilized in or include a variety of systems, methods, and apparatus. FIG. 4 illustrates an exemplary embodiment as a computer system 400 for being or utilizing one or more of the computers, methods, flow diagrams and/or aspects of exemplary embodiments in accordance with the present invention.

The system 400 includes a computer system 420 (such as a host or client computer) and a repository, warehouse, or database 430. The computer system 420 comprises a processing unit 440 (such as one or more processors of central processing units, CPUs) for controlling the overall operation of memory 450 (such as random access memory (RAM) for temporary data storage and read only memory (ROM) for permanent data storage). The memory 450, for example, stores applications, data, control programs, algorithms (including diagrams and methods discussed herein), and other data associated with the computer system 420. The processing unit 440 communicates with memory 450 and data base 430 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

Further, exemplary embodiments are not limited to any particular type of protocol for communicating with the database and/or directories. LDAP is one example of such a protocol. In LDAP, a client starts an LDAP session by connecting to an LDAP server and then sends operation requests to the server, which responds to the requests. For example, the server returns directory entries corresponding to an incoming search request. With some exceptions, the client need not wait for a response before sending the next request, and the server can send the responses in any order. The client can request operations such as the following: Bind (i.e., authenticate and specify LDAP protocol version), Start TLS, Search (i.e., search for and/or retrieve directory entries), Compare (test if a named entry contains a given attribute value), Add a new entry, Delete an entry, Modify an entry, Modify Distinguished Name (move or rename an entry), Abandon (abort a previous request), Extended Operation (generic operation used to define other operations), and Unbind (close the connection).

Exemplary embodiments can be used in a variety of contexts, for example used to discover an object (for example, a computer) in a directory. A user may want to determine if the computer is a member of a specific domain, but may not know information about the branches of the containers that include the computer. Exemplary embodiments provide information about the path or paths through the directory in which the computer is located. Since the paths themselves have attributes, these attributes are useful in further categorizing the computer. This additional path information can be added to the description of the object. The description (now improved with the pathway information) can be displayed to a user, stored in memory, used to define the object, used for searching, etc. For example, the description could be stored with the object, discarded, or moved and stored at another database or location.

Definitions: As used herein and in the claims, the following words and terms are defined as follows:

A "database" is a structured collection of records or data that is stored in a computer system.

A "directory" is a set of objects with similar attributes organized in a logical and hierarchical manner.

A "directory information tree" is data represented in a hierarchical tree structure that includes distinguished names of the directory entries.

A "directory service" is one or more software applications that store and organize information about network resources and users of a computer network, and that allow network administrators to manage users' access to the resources. Additionally, directory services act as an abstraction layer between users and shared resources.

A "Distinguished Name" or "DN" is a unique identifier of an entry in a directory information tree.

A "Domain Name System" or "DNS" associates various sorts of information with domain names and serves as a "phone book" for the Internet by translating human-readable computer hostnames, e.g. www.example.com, into the IP addresses, e.g. 208.77.188.166, that networking equipment uses to deliver information. DNS also stores other information such as the list of mail exchange servers that accept email for a given domain.

A "LDAP" or "Light Weight Directory Access Protocol" is an application protocol for accessing, querying, and/or modifying directory services runner over TCP/IP (Transmission Control Protocol/Internet Protocol). LDAP deployments often use Domain Name System (DNS) names for structuring the topmost levels of the hierarchy. Deeper inside the directory can appear entries representing people, organizational units, documents, groups of people, objects (computers, servers, printers, etc.) or anything else that represents a given tree entry (or multiple entries).

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps can be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein (such as being implemented in a server or controller). The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known tangible storage media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in tangible physical memory or media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer system, comprising:
discovering, by the computer system, branches that include a reference to an object located in a directory information tree;
determining, by the computer system, paths through the directory information tree to the branches;
using, by the computer system, information about the paths to locate the object in one of plural groups in the directory information tree and to describe the object based on attributes of members of the paths;
collecting attributes about branches along the paths, wherein the attributes about the branches along the paths include a domain name;
determining a type of each of the branches and the groups; and
prioritizing the branches over the groups.

2. The method of claim 1 further comprising:
searching each of the discovered branches for the object by a short name or fully qualified name of the object;
when a given branch includes a reference to the object, reading additional information from the given branch in order to locate the object in the one of the plural groups.

3. The method of claim 1 further comprising considering the object to be a member of each of the branches along the paths to further describe the object based on attributes of the branches along the paths.

4. The method of claim 1 further comprising:
finding a distinguished name for the object in the directory information tree;
using the distinguished name to find the object in the groups.

5. The method of claim 1, wherein using the information about the paths to describe the object comprises adding the information about the paths to a description of the object.

6. The method of claim 1, wherein each of the plural groups includes references to corresponding objects.

7. The method of claim 6, wherein the references in each of the plural groups include distinguished names.

8. The method of claim 1, further comprising searching each of the branches for the object by a name of the object.

9. The method of claim 8, wherein the name is a short name or fully qualified name of the object.

10. A computer system, comprising:
a memory to store program code;
a processor, the program code executable on the processor to:

discover branches that include a reference to an object located in a directory information tree;

determine paths through the directory information tree to the branches;

use information about the paths to locate the object in one of plural groups in the directory information tree and to describe the object based on attributes of members of the paths; and prioritize the branches over the groups to improve a success rate of finding the object in the directory information tree.

11. The computer system of claim 10, wherein the program code is executable on the processor to further:

search each of the branches for the object by a short name or fully qualified name of the object;

when a given branch includes a reference to the object, read additional information from the given branch to locate the object in one of the plural groups.

12. The computer system of claim 10, wherein the directory information tree includes a Light Weight Directory Access Protocol (LDAP) directory.

13. The computer system of claim 10, wherein the processor is to add the information about the paths to a description of the object.

14. The computer system of claim 10, wherein the program code is executable on the processor to further search each of the branches for the object by a name of the object.

15. The computer system of claim 14, wherein the name is a short name or fully qualified name of the object.

16. A non-transitory computer readable medium storing instructions that upon execution cause a computer to:

discover branches that include a reference to an object located in a directory information tree;

determine paths through the directory information tree to the branches;

use information about the paths to locate the object in one of plural groups in the directory information tree and to describe the object based on attributes of members of the paths; and prioritize the branches over the groups to improve a success rate of finding the object in the directory information tree.

17. The non-transitory computer readable medium of claim 16, wherein using the information about the paths to describe the object comprises adding the information about the paths to a description of the object.

18. The non-transitory computer readable medium of claim 16, wherein the information about the paths includes information about branches in the paths.

19. The non-transitory computer readable medium of claim 16, wherein the object is contained in each of the branches in the paths.

20. The non-transitory computer readable medium of claim 16, wherein the instructions upon execution cause the computer to further:

search each of the branches for the object by a name of the object.

21. The non-transitory computer readable medium of claim 20, wherein the name is a short name or fully qualified name of the object.

* * * * *